(12) United States Patent
Harris

(10) Patent No.: US 12,572,609 B2
(45) Date of Patent: Mar. 10, 2026

(54) DATABASE INDEXING, RANKING, AND OPTIMIZATION SYSTEMS FOR ONLINE QUERIES

(71) Applicant: Demetrius Harris, Austin, TX (US)

(72) Inventor: Demetrius Harris, Austin, TX (US)

( * ) Notice: Subject to any disclaimer, the term of this patent is extended or adjusted under 35 U.S.C. 154(b) by 0 days.

(21) Appl. No.: 18/219,676

(22) Filed: Jul. 9, 2023

(65) Prior Publication Data

US 2024/0012862 A1     Jan. 11, 2024

Related U.S. Application Data

(60) Provisional application No. 63/359,834, filed on Jul. 9, 2022.

(51) Int. Cl.
| | |
|---|---|
| *G06F 16/00* | (2019.01) |
| *G06F 16/951* | (2019.01) |
| *G06F 16/9535* | (2019.01) |
| *G06F 16/9536* | (2019.01) |

(52) U.S. Cl.
CPC ........ *G06F 16/9535* (2019.01); *G06F 16/951* (2019.01); *G06F 16/9536* (2019.01)

(58) Field of Classification Search
CPC . G06F 16/9535; G06F 16/951; G06F 16/9536

USPC ........................................................ 707/722
See application file for complete search history.

(56) References Cited

U.S. PATENT DOCUMENTS

2018/0300393 A1* 10/2018 Brandstetter .......... G06Q 50/01
                                                          707/707

* cited by examiner

*Primary Examiner* — Alexandria Y Bromell

(57) ABSTRACT

The proposed software takes input from numerous sources to provide as much credible and relevant information as possible in a short period of time for a given user making an inquiry. Inputs include profile data from the user via direct data input or API(s) (such as geographical, lifestyle and hobby, age, interests, and preferences), query text data on the inquiry, other user profile information, and stored communication threads between users. These 4 pieces of data are used together to index through, and rank query responses that match a user's profile, in addition to identifying and matching other users who qualify to respond to the inquiry for further communication stream. This form of SEO brings a plurality of data sources and information to one database (or a plurality of related databases) such that the information is standardized and actionable resulting in an efficient and desirable model.

4 Claims, 19 Drawing Sheets

400

401

Profile creation

405

Data input via user input or API(s)

410

Obtain query data from a first user

415

Identify topic and key words

420

Search database for threads relevant to query topic

425

Display relevant, ranked threads to the first user

430

Identify a second user qualified to respond to the query data

435

Display query data to the second user

440

Second user accept or deny query data

445     Upon acceptance, respond to query

450     Display response to the first user

455     Further communication between the first and second user

460     First user feedback and scoring of query response

465     Parse and identify, remove/encrypt sensitive information

470     Store communication thread

401

601

701

901

1001

1101

1201

1200

1205

1210

1215

1301

1300

1310

1305

1315

1320

1325

1335

1330

1401

1501

1500

1505

1510

1515

1520

1601

1701

1700

1705

1710

1715

1720

1730

1725

1735

1740

1745

1750

1801

DATABASE INDEXING, RANKING, AND OPTIMIZATION SYSTEMS FOR ONLINE QUERIES

CROSS-REFERENCE TO RELATED APPLICATIONS

The present application claims the benefit of, and priority to, U.S. Provisional Application No. 63/359,834, filed Jul. 9, 2022, and titled "Communication Facilitating Software and Method", which is hereby incorporated by reference herein in its entirety for all purposes.

BACKGROUND

Field of Art

This invention is related to database systems. More specifically, indexing, ranking, and optimization systems for online queries.

Background

Current methods of surfacing relevant content online are limited in usefulness when a user has a question that requires nuance, such as, when seeking advice on travel destinations, hobbies, careers, products, etc. Currently available technologies implement search engine optimization (SEO) to enable web pages to be indexed more efficiently and in a way that webpages can be crawled for content. That content may be matched to a user query for relevance and ranked based on a variety of factors, such as backlinks, traffic, page speed, etc. These systems do a decent job of surfacing relevant web pages to respond to simple queries, but they fail to surface relevant web pages based on the quality of the answer and/or the background/detail about the author, and the inquirer.

Some social networking systems try to alleviate this problem by crowdsourcing the ranking to other users of the social network. For example, websites like Quora and Reddit enable users to rank or upvote posts and display the highest-ranking posts first. This improves on the SEO model, but does not always help quickly reveal the most relevant and credible answers with regards to this specific user. For example, posts on these social media networks can be gamed to become a popularity contest, in addition to this, the popular opinion may not align with this specific user's values or lifestyle.

Surfaced web pages from online search engines and platforms like Quora and Reddit lead to more being desired with regards to further queries such as date relevancy, and a follow-up query in response to the query response.

Current models lead to inefficient and/or undesirable matching between available content and user queries.

SUMMARY

The proposed software takes input from numerous sources to provide as much credible and relevant information as possible in a short period of time for a given user making an inquiry. Inputs include profile data from the user via direct data input or API(s) (such as geographical, lifestyle and hobby, age, interests, and preferences), query text data on the inquiry, other user profile information, and stored communication threads between users. These 4 pieces of data are used together to index through, and rank query responses that match a user's profile, in addition to identifying and matching other users who qualify to respond to the inquiry for further communication stream.

This form of SEO brings a plurality of data sources and information to one database (or a plurality of related databases) such that the information is standardized and actionable. This results in an optimization model that matches user queries to available content in an efficient and desirable manner.

In one exemplary embodiment of the invention, user queries are met with multiple sources of relevant, and credible information quickly with an ability to execute follow-up queries through continued communication with the responding user. The relevancy of surfaced information being established through parsing through key words in the input query data and matching these to stored communication threads then utilizing profile information to further establish relevancy to the user with the inquiry. The credibility of surfaced information and users providing query responses being established through feedback from other users that is continuously fed into the matching algorithm along with verification of a user's expertise through a third party. With continued and live communication streams available to the inquiring user, up-to-date and the latest information is guaranteed. As there may be multiple responses to an inquiry, the matching algorithm and stored data retrieval that is personalized to each user enables confidence in the response surfaced and received.

BRIEF DESCRIPTION OF THE DRAWING FIGURES

The accompanying drawings illustrate several embodiments and, together with the description, serve to explain the principles of the invention according to the embodiments. It will be appreciated by one skilled in the art that the particular arrangements illustrated in the drawings are merely exemplary and are not to be considered as limiting of the scope of the invention or the claims herein in any way.

DETAILED DESCRIPTION OF EMBODIMENTS

Figure 1:
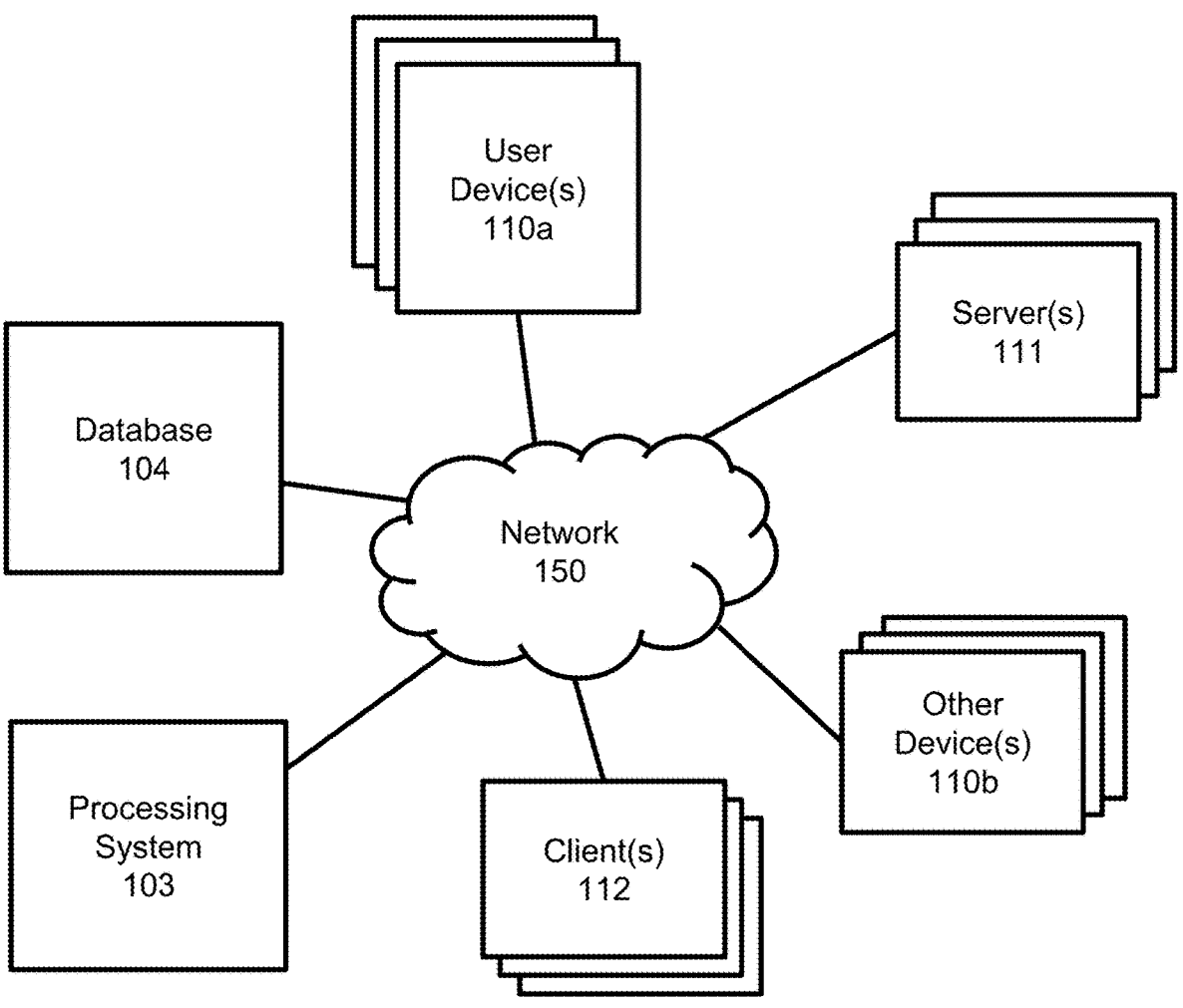
FIG. 1 illustrates a block diagram depicting an example of an application ecosystem highlighting how the components collaborate and communicate with each other to deliver optimized results.

The proposed software takes input from numerous sources to provide as much credible and relevant information as possible in a short period of time for a given user making an inquiry. Inputs include profile data from the user via direct data input or API(s) (such as geographical, lifestyle and hobby, age, interests, and preferences), query text data on the inquiry, other user profile information, and stored communication threads between users. These 4 pieces of data are used together to index through, and rank query responses that match a user's profile, in addition to identifying and matching other users who qualify to respond to the inquiry for further communication stream.

One or more different embodiments may be described in the present application. Further, for one or more of the embodiments described herein, numerous alternative arrangements may be described; it should be appreciated that these are presented for illustrative purposes only and are not limiting of the embodiments contained herein or the claims presented herein in any way. One or more of the arrangements may be widely applicable to numerous embodiments, as may be readily apparent from the disclosure. In general, arrangements are described in sufficient detail to enable those skilled in the art to practice one or more of the embodiments, and it should be appreciated that other arrangements may be utilized and that structural, logical, software, electrical and other changes may be made without departing from the scope of the embodiments. Particular features of one or more of the embodiments described herein may be described with reference to one or more particular embodiments or figures that form a part of the present disclosure, and in which are shown, by way of illustration, specific arrangements of one or more of the aspects. It should be appreciated, however, that such features are not limited to usage in the one or more particular embodiments or figures with reference to which they are described. The present disclosure is neither a literal description of all arrangements of one or more of the embodiments nor a listing of features of one or more of the embodiments that must be present in all arrangements.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible embodiments and in order to more fully illustrate one or more embodiments. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the embodiments, and does not imply that the illustrated process is preferred. Also, steps are generally described once per aspect, but this does not mean they must occur once, or that they may only occur once each time a process, method, or algorithm is carried out or executed. Some steps may be omitted in some embodiments or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various embodiments in which, for example, functions may be executed out of order from that shown or discussed, including substantially concurrently or in reverse order, depending on the functionality involved, as would be understood by those having ordinary skill in the art.

The detailed description set forth herein in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

FIG. 1 illustrates a block diagram depicting an example of an application ecosystem highlighting how the components collaborate and communicate with each other to deliver optimized results. This ecosystem may include various components such as a processing system 103 representing the central processing unit (CPU) responsible for executing computations and handling data processing tasks. The processing system 103 may be a powerful server or a high-performance cloud computing platform. The database component 104 stores and manages structured data. It may be a relational database management system (RDBMS) like MySQL or PostgreSQL, or a NoSQL database such as MongoDB or Cassandra. User Devices 110a allows interaction with the application. Examples of user devices may include smartphones, tablets, laptops, or desktop computers. Other devices 110b refers to additional devices that may interact with the application ecosystem. Other devices 110b may include Internet of Things (IoT) devices such as beacons, payment terminals, or any other connected devices. Beacons are small wireless devices that use Bluetooth Low Energy (BLE) technology to transmit signals to nearby mobile devices. They enable location-based interactions and can provide contextual information or trigger specific actions in mobile applications. Retail stores, museums, and event venues often use beacons to deliver personalized content or navigation assistance. Servers 111 play a role in hosting and delivering the application's services. They may handle requests from user devices and perform various tasks such as processing, storage, and data retrieval. Servers 111 may be physical machines or virtualized instances in cloud environments. In some embodiments the server may connect applications and retrieve data through an API from platforms like Apple, Facebook, Google, Twitter, Instagram, LinkedIn, or Workday. Clients 112 represent the software applications or interfaces that run on user devices to interact with the application. Clients 112 may be web browsers or a program requesting data from the software such as Chat GPT, LinkedIn, etc. Network component 150 connects all elements within the ecosystem, enabling data transmission and communication. It could be a local area network (LAN), a wide area network (WAN), or the internet itself.

User device(s) 110 include, generally, a computer or computing device including functionality for communicating (e.g., remotely) over a network 150. Data may be collected from user devices 110, and data requests may be initiated from each user device 110. User device(s) 110 may be a server, a desktop computer, a laptop computer, personal digital assistant (PDA), an in- or out-of-car navigation system, a smart phone or other cellular or mobile phone, or mobile gaming device, among other suitable computing devices. User devices 110 may execute one or more applications, such as a web browser (e.g., Microsoft Windows Internet Explorer, Mozilla Firefox, Apple Safari, Google Chrome, and Opera, etc.), or a dedicated application to submit user data, or to make prediction queries over a network 150.

In particular embodiments, each user device 110 may be an electronic device including hardware, software, or embedded logic components or a combination of two or more such components and capable of carrying out the appropriate functions implemented or supported by the user device 110. For example and without limitation, a user device 110 may be a desktop computer system, a notebook computer system, a netbook computer system, a handheld electronic device, or a mobile telephone. The present disclosure contemplates any user device 110. A user device 110 may enable a network user at the user device 110 to access network 150. A user device 110 may enable its user to communicate with other users at other user devices 110.

A user device 110 may have a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user device 110 may enable a user to enter a Uniform Resource Locator (URL) or other address directing the web browser to a server, and the web browser may generate a Hyper Text Transfer Protocol (HTTP) request and communicate the HTTP request to server. The server may accept the HTTP request and communicate to the user device 110 one or more Hyper Text Markup Language (HTML) files responsive to the HTTP request. The user device 110 may render a web page based on the HTML files from server for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

The user device 110 may also include an application that is loaded onto the user device 110. The application obtains data from the network 150 and displays it to the user within the application interface.

Exemplary user devices are illustrated in some of the subsequent figures provided herein. This disclosure contemplates any suitable number of user devices, including computing systems taking any suitable physical form. As example and not by way of limitation, computing systems may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computing system may include one or more computer systems; be unitary or distributed; span multiple locations; span multiple machines; or reside in a cloud, which may include one or more cloud components in one or more networks. Where appropriate, one or more computing systems may perform without substantial spatial or temporal limitation one or more steps of one or more methods described or illustrated herein. As an example, and not by way of limitation, one or more computing systems may perform in real time or in batch mode one or more steps of one or more methods described or illustrated herein. One or more computing systems may perform at different times or at different locations one or more steps of one or more methods described or illustrated herein, where appropriate.

Network cloud 150 generally represents a network or collection of networks (such as the Internet or a corporate intranet, or a combination of both) over which the various components illustrated in FIG. 1 (including other components that may be necessary to execute the system described herein, as would be readily understood to a person of ordinary skill in the art). In particular embodiments, network 150 is an intranet, an extranet, a virtual private network (VPN), a local area network (LAN), a wireless LAN (WLAN), a wide area network (WAN), a metropolitan area network (MAN), a portion of the Internet, or another network 150 or a combination of two or more such networks 150. One or more links connect the systems and databases described herein to the network 150. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable network 150, and any suitable link for connecting the various systems and databases described herein.

The network 150 connects the various systems and computing devices described or referenced herein. In particular embodiments, network 150 is an intranet, an extranet, a virtual private network (VPN), a local area network (LAN), a wireless LAN (WLAN), a wide area network (WAN), a metropolitan area network (MAN), a portion of the Internet, or another network 421 or a combination of two or more such networks 150. The present disclosure contemplates any suitable network 150.

One or more links couple one or more systems, engines or devices to the network 150. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable links coupling one or more systems, engines or devices to the network 150.

In particular embodiments, each system or engine may be a unitary server or may be a distributed server spanning multiple computers or multiple datacenters. Systems, engines, or modules may be of various types, such as, for example and without limitation, web server, news server, mail server, message server, advertising server, file server, application server, exchange server, database server, or proxy server. In particular embodiments, each system, engine or module may include hardware, software, or embedded logic components or a combination of two or more such components for carrying out the appropriate functionalities implemented or supported by their respective servers. For example, a web server is generally capable of hosting websites containing web pages or particular elements of web pages. More specifically, a web server may host HTML files or other file types, or may dynamically create or constitute files upon a request, and communicate them to client/user devices or other devices in response to HTTP or other requests from client devices or other devices. A mail server is generally capable of providing electronic mail services to various client devices or other devices. A database server is generally capable of providing an interface for managing data stored in one or more data stores.

In particular embodiments, one or more data storages may be communicatively linked to one or more servers via one or more links. In particular embodiments, data storages may be used to store various types of information. In particular embodiments, the information stored in data storages may be organized according to specific data structures. In particular embodiment, each data storage may be a relational database. Particular embodiments may provide interfaces that enable servers or clients to manage, e.g., retrieve, modify, add, or delete, the information stored in data storage.

The system may also contain other subsystems and databases, which are not illustrated in FIG. 1, but would be readily apparent to a person of ordinary skill in the art. Other databases and systems may be added or subtracted, as would be readily understood by a person of ordinary skill in the art, without departing from the scope of the invention.

Figure 2:
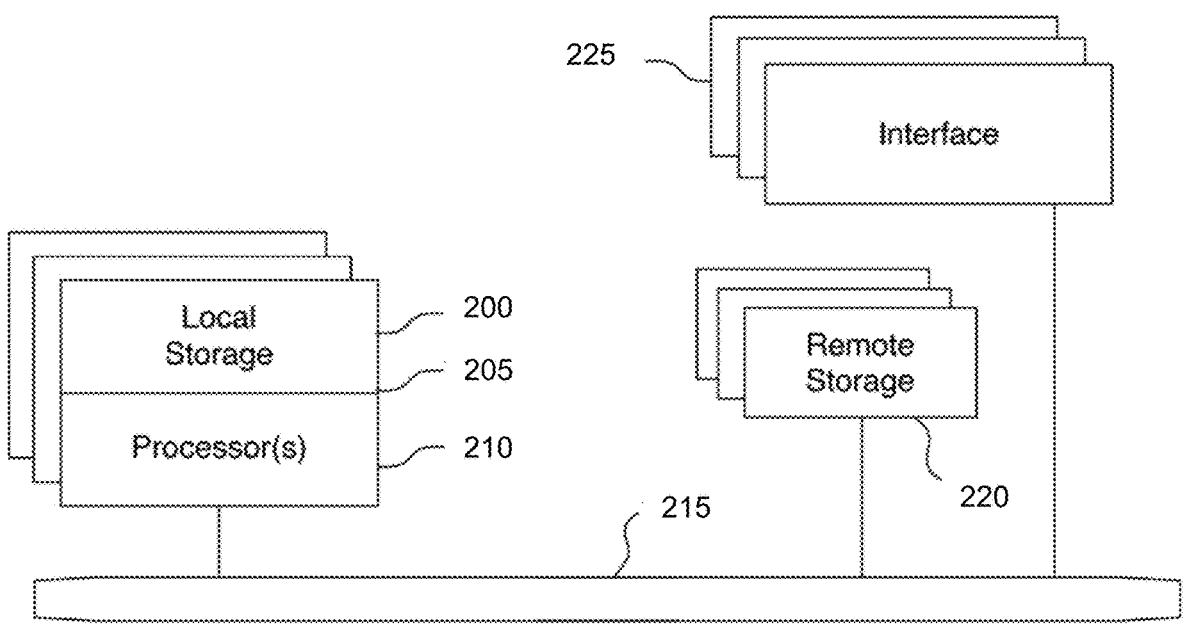
FIG. 2 illustrates a block diagram depicting an example of an architecture for communication and interaction ensuring seamless integration and efficient operation of system.

FIG. 2, there is shown a block diagram depicting an exemplary computing device suitable for implementing at least a portion of the features or functionalities disclosed herein. The computing device may be, for example, any one of the computing machines listed in the previous paragraph, or indeed any other electronic device capable of executing software- or hardware-based instructions according to one or more programs stored in memory. The computing device may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, the computing device includes one or more central processing units (CPU) 205, one or more interfaces 225, and one or more busses 215 (such as a peripheral component interconnect (PCI) bus). When acting under the control of appropriate software or firmware, CPU 205 may be responsible for implementing specific functions associated with the functions of a specifically configured computing device or machine. For example, in at least one aspect, a computing device may be configured or designed to function as a server system utilizing CPU 205, local memory 200 and/or remote memory 220, and interface(s) 225. In at least one aspect, CPU 205 may be caused to perform one or more of the different types of functions and/or operations under the control of software modules or components, which for example, may include an operating system and any appropriate applications software, drivers, and the like.

CPU 205 may include one or more processors 210 such as, for example, a processor from one of the Intel, ARM, Qualcomm, and AMD families of microprocessors. In some embodiments, processors 210 may include specially designed hardware such as application-specific integrated circuits (ASIC s), electrically erasable programmable read-only memories (EEPROMs), field-programmable gate arrays (FPGAs), and so forth, for controlling operations of the computing device. In a particular aspect, a local memory 200 (such as non-volatile random-access memory (RAM) and/or read-only memory (ROM), including for example one or more levels of cached memory) may also form part of CPU 205. However, there are many different ways in which memory may be coupled to the system. Memory 200 may be used for a variety of purposes such as, for example, caching and/or storing data, programming instructions, and the like. It should be further appreciated that CPU 205 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 225 are provided as network interface cards (NICs). Generally, NICs control the sending and receiving of data packets over a computer network; other types of interfaces 225 may for example support other peripherals used with the computing device. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FD-DIs), and the like. Generally, such interfaces 225 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 2 illustrates one specific architecture for a computing device for implementing one or more of the embodiments described herein, it is by no means the only device architecture on which at least a portion of the features and techniques described herein may be implemented. For example, architectures having one or any number of processors 210 may be used, and such processors 210 may be present in a single device or distributed among any number of devices. In one aspect, single processor 210 handles communications as well as routing computations, while in other embodiments a separate dedicated communications processor may be provided. In various embodiments, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 220 and local memory 200 configured to store data, program instructions for the general-purpose network operations, or other information relating to the functionality of the embodiments described herein (or any combinations of the above). Program instructions may control execution of or comprise an operating system and/or one or more applications, for example. Memory 220 or memories 200, 220 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein.

Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 3:
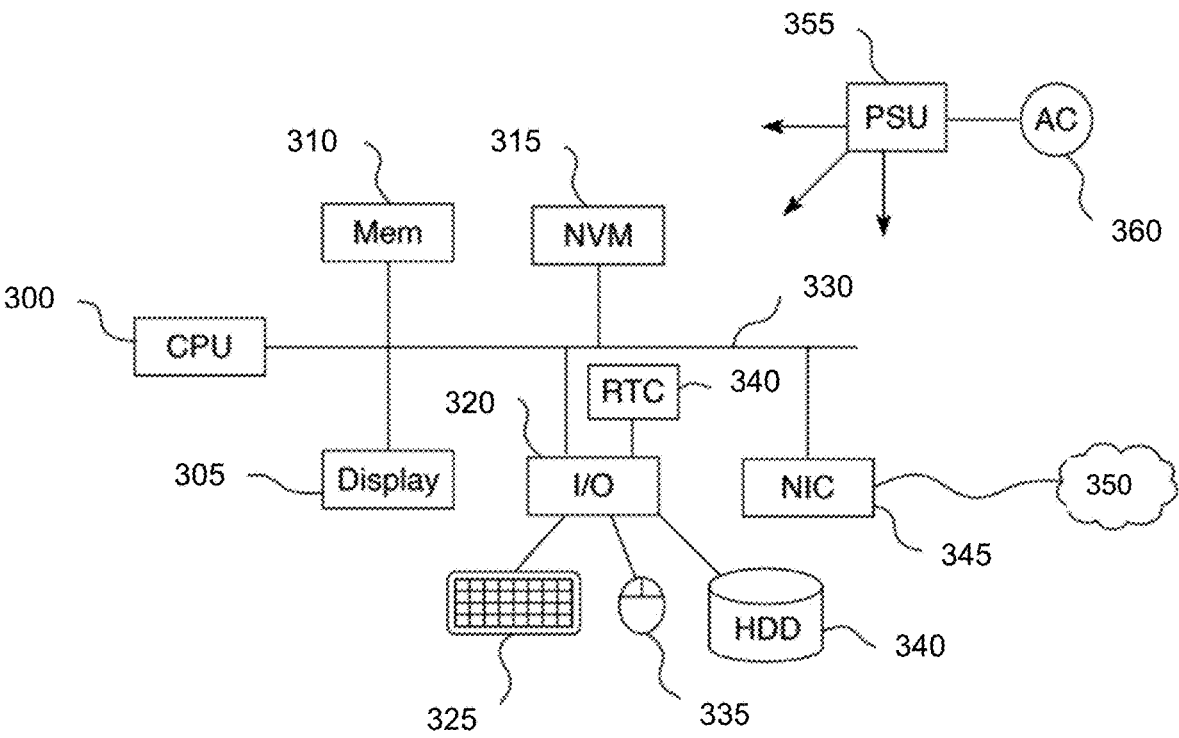
FIG. 3 illustrates a block diagram depicting an example of a functional computing system that powers and supports a query optimization system.

FIG. 3 shows an exemplary overview of a computer system as may be used in any of the various locations throughout the system. It is exemplary of any computer that may execute code to process data. Various modifications and changes may be made to the computer system without departing from the broader scope of the system and method disclosed herein. Central processor unit (CPU) 300 is connected to bus 330, to which bus is also connected memory 310, nonvolatile memory 315, display 305, input/output (I/O) unit 320, and network interface card (NIC) 345. I/O unit 320 may, typically, be connected to keyboard 325, pointing device 335, hard disk 340, and real-time clock 340. NIC 345 connects to network 350, which may be the Internet or a local network, which local network may or may not have connections to the Internet. Also shown as part of system is power supply unit 355 connected, in this example, to a main alternating current (AC) supply 360. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

Figure 4A:
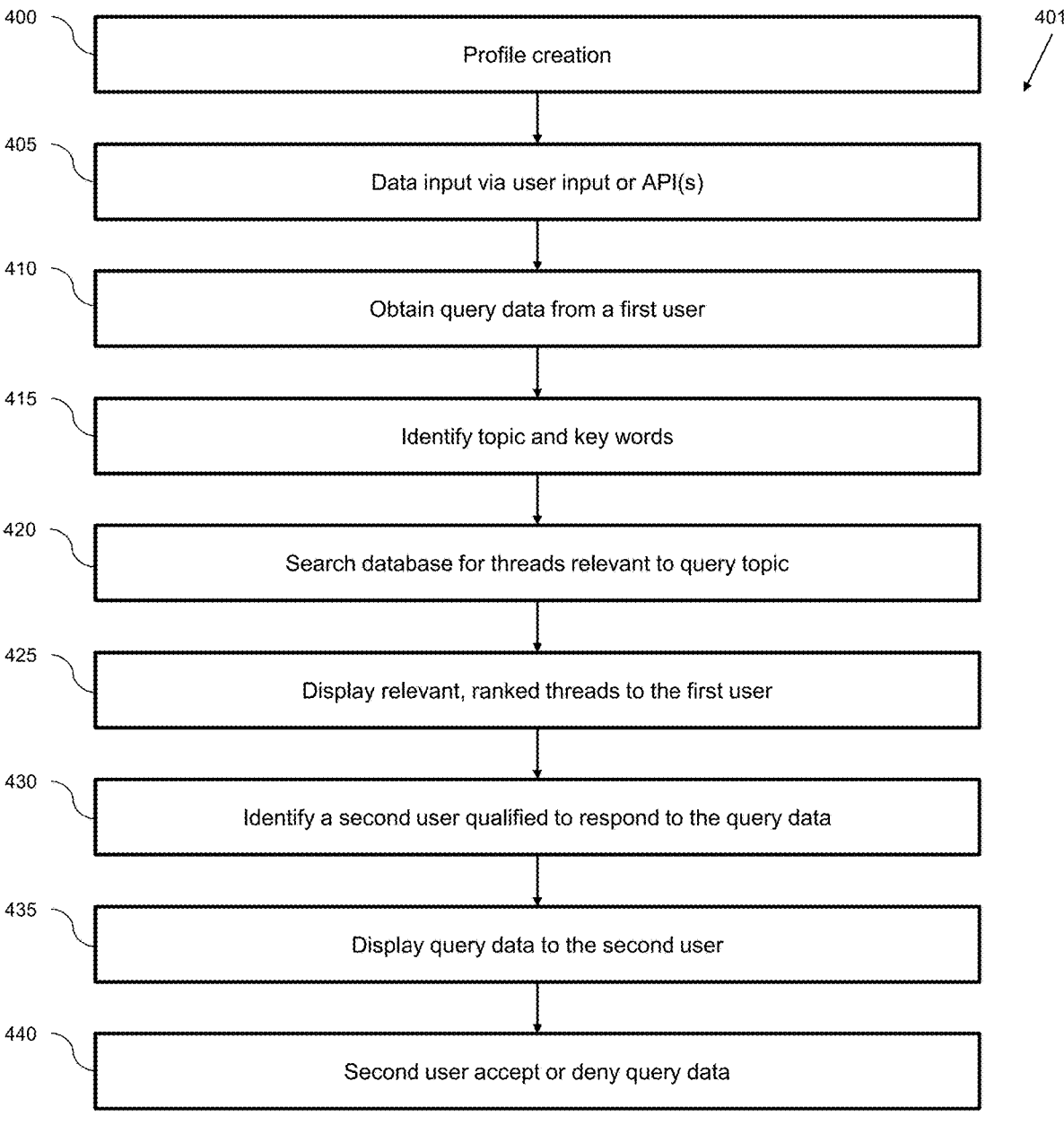
FIG. 4A illustrates a flow diagram depicting an example method for database indexing, ranking, and optimization for online queries.
Figure 4B:
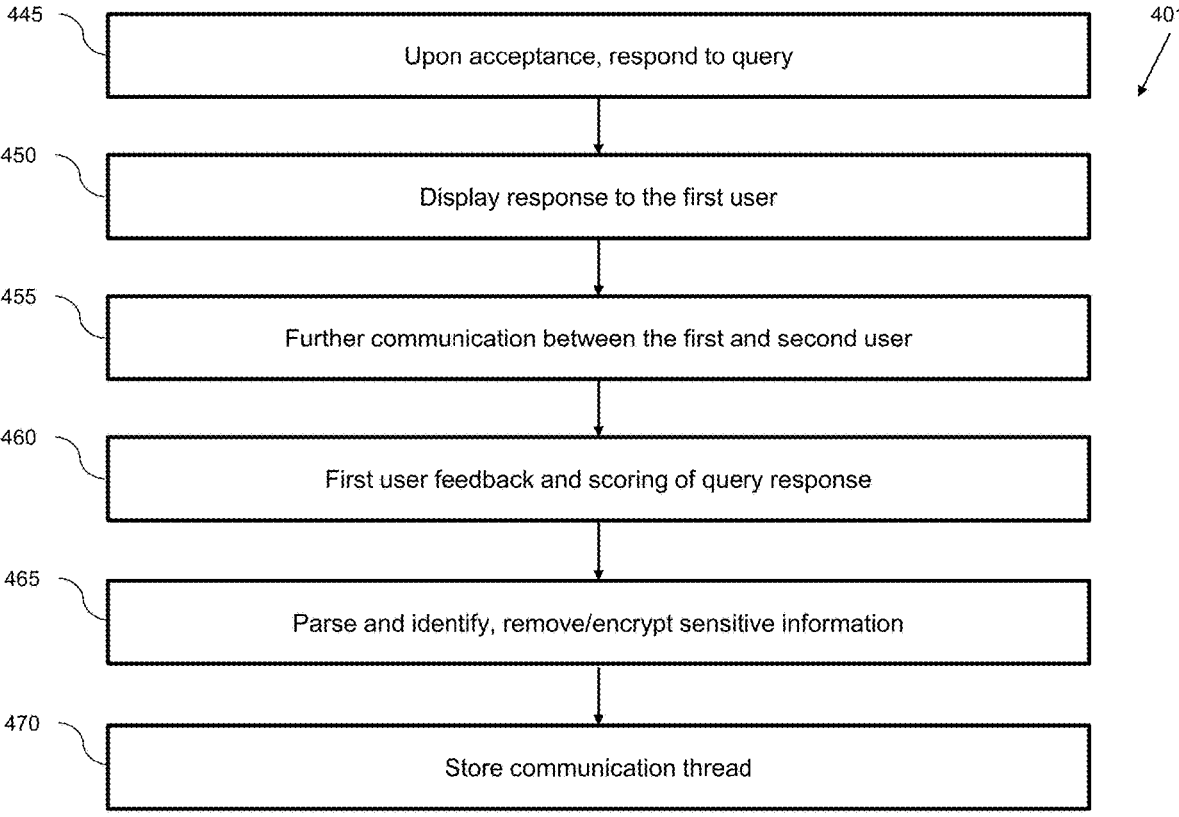
FIG. 4B illustrates a flow diagram depicting an example method for database indexing, ranking, and optimization for online queries.

FIG. 4A and FIG. 4B. illustrate a flow diagram depicting an example method for database indexing, ranking, and optimization for online queries. The various processing blocks and/or data flows depicted in 401 are described in greater detail herein. The described processing blocks may be accomplished using some or all of the system components described in detail above and, in some implementations, various processing blocks may be performed in different sequences and various processing blocks may be omitted. Additional processing blocks may be performed along with some or all the processing blocks shown in the depicted flow diagrams: Some processing blocks may be performed simultaneously. Accordingly, method 401 as illustrated (and described in greater detail below) is meant to be an example and, as such, should not be viewed as limiting. Method 401 may be implemented in the form of executable instructions stored on a machine-readable storage medium and/or in the form of electronic circuitry.

In block 400, method 401 may include creating a profile in which database 104 receives data comprising a plurality of segments representing information on a user. In one embodiment this step is optional.

In block 405, method 401 may include input of segments which may be via direct user input or API(s) such as Google Maps, Google, Apple, LinkedIn, Instagram, Facebook, Workday, Pinterest, etc.

In block 410, method 401 may include an input of query data from a first user which may be in the form of text, or media. Query data may include information on the user's timestamped information automatically, such as GPS data, GLASNOS, Galileo data, or timestamp.

In block 415, method 401 may include parsing the query data to identify at least one query topic, wherein identifying keywords in the query data is accomplished through YAKE, RAKE, TextRank, KeyBert, Naive Bayes classifier, or pre-trained models for keyword extraction such as but not limited to Bag-of-words, TF-IDF, Averaged GloVe, Bag-of-Concepts, VLAC, BoWC. In another embodiment, key word identification may be through user identification.

In block 420, method 401 may include searching database 104 for stored data or threads that are relevant to the query topic identified in 415 wherein matching the keyword data is accomplished through YAKE, RAKE, TextRank, KeyBert, Naive Bayes classifier, or pre-trained models for keyword extraction such as but not limited to Bag-of-words, TF-IDF, Averaged GloVe, Bag-of-Concepts, VLAC, BoWC.

In block 425, method 401 may include displaying relevant, ranked data or threads to a user. In one embodiment this may be displayed in terms of a ranking from most relevant to least relevant or ranking from other users in terms of helpfulness or score.

In block 430, method 401 may include identifying a second user qualified to respond to the query data based on the parsed and identified topic of 415 along with data stored for profile information of the first user and second user, wherein both data sets of identified topic and profile information data is used to determine qualification for the query response.

In block 435, method 401 may include displaying query data to the second user.

In block 440, method 401 may include presenting an option to accept (respond) or deny (archive) the query data.

In block 445, method 401 may include accepting a query and initializing a communication stream with the first user.

In block 450, method 401 may include displaying the initial response to the first user.

In block 455, method 401 may include enabling the first user to continue further communicate with the second user who responded to the query request.

In block 460, method 401 may include the first user to provide a score and feedback on the information received which will feed into the matching algorithm for both the first and second user.

In block 465, method 401 may include parsing the text thread to identify, remove/encrypt sensitive information.

In block 470, method 401 may include storing the communication thread data in a database 104.

Figure 5:
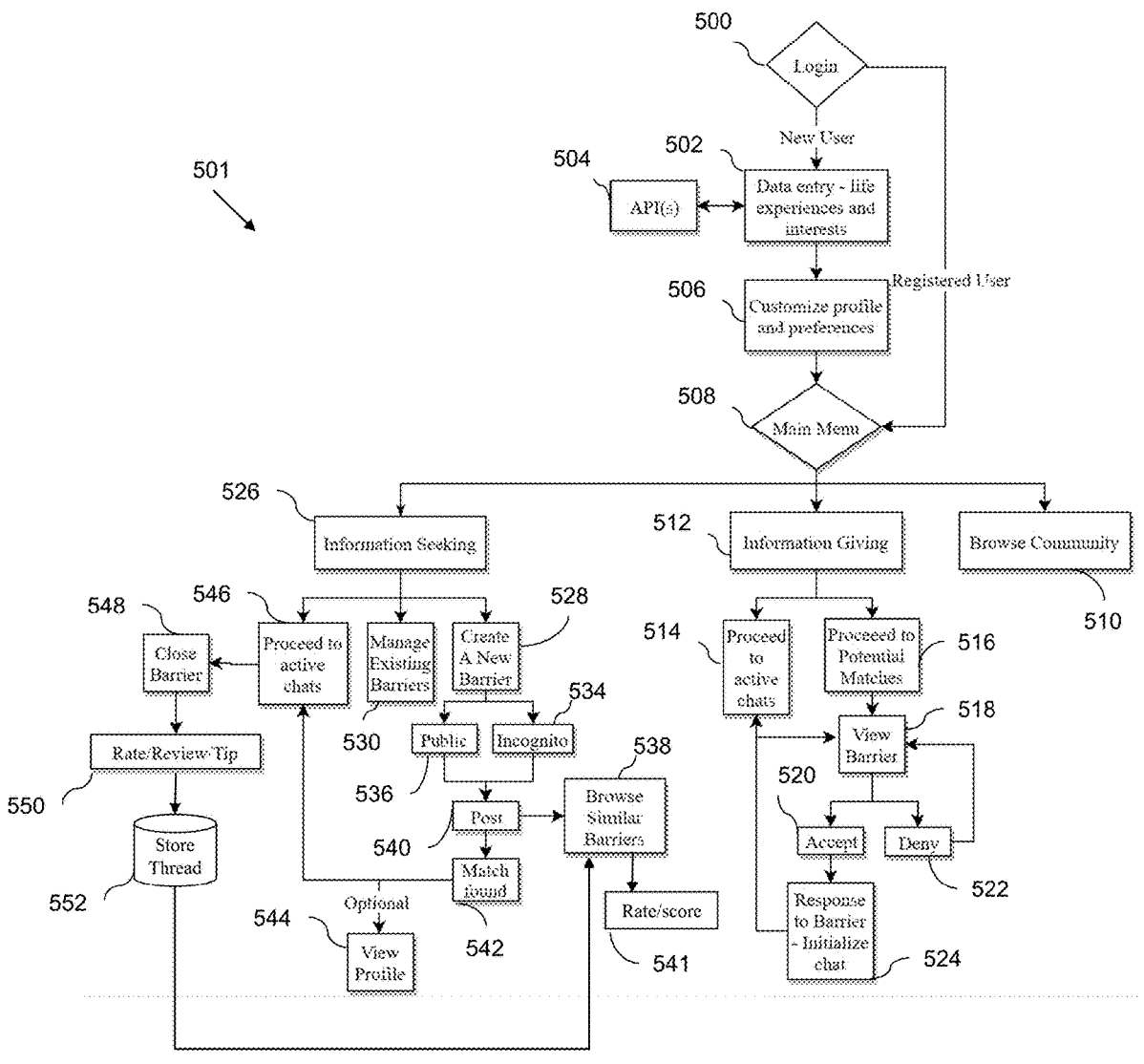
FIG. 5 illustrates a flow diagram depicting an embodiment of a user's workflow for inquiring and receiving optimized and ranked responses to query data, along with providing/storing optimized responses to query data.

FIG. 5. illustrates a flow diagram depicting an embodiment of a user's workflow for inquiring and receiving optimized and ranked responses to query data, storing optimized responses to query data, and providing responses to queries. The various processing blocks and/or data flows depicted in 501 are described in greater detail herein. The described processing blocks may be accomplished using some or all of the system components described in detail above and, in some implementations, various processing blocks may be performed in different sequences and various processing blocks may be omitted. Additional processing blocks may be performed along with some or all the processing blocks shown in the depicted flow diagrams: Some processing blocks may be performed simultaneously. Accordingly, embodiment 501 as illustrated (and described in greater detail below) is meant to be an example and, as such, should not be viewed as limiting. embodiment 501 may be implemented in the form of executable instructions stored on a machine-readable storage medium and/or in the form of electronic circuitry.

In block 500, embodiment 501 may include presenting a user with the option for a user to initialize a data set for a new profile via API(s) 504 such as Google Maps, Google, Apple, LinkedIn, Instagram, Facebook, Workday, Pinterest, etc. or user input data 502 via a Graphical User Interface, or input login credentials for a returning user to proceed directly to a main menu page. Upon a new user initializing a profile dataset, preferences and profile customization 506 may be updated from a default setting. Preferences may be in the form of preferred ages, desired strength of match, etc.

In block 508, embodiment 501 may include presenting a user with the option of seeking information (inputting query data) 526, giving information (responding to query data) 512, or browsing the community (stored communication data) 510.

In block 526, embodiment 501 may include presenting a user with the option of, proceeding to a Graphical User Interface which includes all active chats 546, managing open queries (manage existing barriers) 530, or create a new query (create a new barrier) 528.

In block 528, embodiment 501 may include presenting a user with the option of choosing to input query data and search for a qualified user showing their profile information and dataset (public) 536, or hiding their information (incognito) 534.

In block 540, embodiment 501 may include the user posting query data to be ran through the algorithm identified in 420 to find a match of a second user for further communication 542 based on profile information of the inputting user and a responding user, along with topic data, and find a match for stored threads (browse similar barriers) 538 based on profile information of the inputting user and a responding user, topic data, and scoring of the communication data from user's scores of relevance, helpfulness etc.

further allowing a rating/score of the matched thread depending on helpfulness 541.

In block 546, embodiment 501 may include the user continuing a communication stream with the second user responding to the query data wherein when finished with the data exchange the user may be able to close the query (close barrier) 548.

In block 548, embodiment 501 may include the user an option to provide feedback on the query response (rate/review/tip) 550 which may be used for further advancing the matching algorithm and model for both the first and second user.

In block 552, embodiment 501 may include the communication stream data being parsed and sensitive information detected, wherein identifying keywords in the data and detecting sensitive information is accomplished through YAKE, RAKE, TextRank, KeyBert, Naive Bayes classifier, or pre-trained models for keyword extraction such as but not limited to Bag-of-words, TF-IDF, Averaged GloVe, Bag-of-Concepts, VLAC, BoWC. In another embodiment, sensitive information identification may be through user identification. Identified sensitive information may be removed and/or encrypted and stored (store thread) 552 for future use in the algorithm and presenting to other users 538.

In block 512, embodiment 501 may include a user with the option of providing a response to a query by going to active chats 514 or proceeding to a queue of query data that the user is qualified to respond to based on, profile data of the user inputting query data and the user responding to query data and the topic of the query data identified in 430.

In block 516, embodiment 501 may include a Graphical User Interface displaying query data the user is qualified to respond to (view barrier) 518, and an option to accept 520 and initialize the communication stream with a response 524 or deny/archive the query data (deny) 522 and move to the next query data in queue.

In block 510, embodiment 501 may include a Graphical User Interface displaying stored thread data 552 (browse community).

Figure 6:
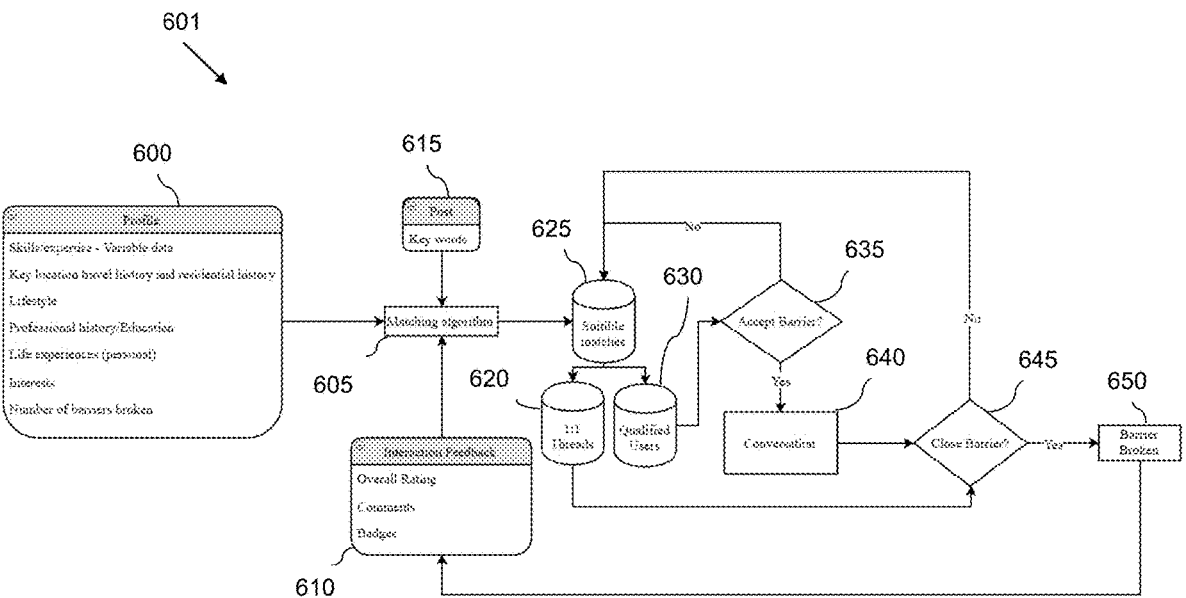
FIG. 6 illustrates a flow diagram of example information and components used to optimize and present results for online inquiries.

FIG. 6 illustrates a flow diagram of example information and components used to optimize and present results for online inquiries. The various processing blocks and/or data flows depicted in 601 are described in greater detail herein. The described processing blocks may be accomplished using some or all of the system components described in detail above and, in some implementations, various processing blocks may be performed in different sequences and various processing blocks may be omitted. Additional processing blocks may be performed along with some or all the processing blocks shown in the depicted flow diagrams: Some processing blocks may be performed simultaneously. Accordingly, embodiment 601 as illustrated (and described in greater detail below) is meant to be an example and, as such, should not be viewed as limiting. embodiment 601 may be implemented in the form of executable instructions stored on a machine-readable storage medium and/or in the form of electronic circuitry.

In block 600, embodiment 601 may include a profile dataset for a first and second user used as an input to the matching algorithm 605.

In block 615, embodiment 601 may include input query data key words identified in 415 used as an input to the matching algorithm 605.

In block 610, embodiment 601 may include historical feedback for a first and/or second user identified in 550 used as an input to the matching algorithm 605.

In block 605, embodiment 601 may include taking inputs from profile datasets of a first and second user 600, parsed and identified query data key words 615, and historical feedback 610, and outputting a set of qualified matches 625.

In block 625, embodiment 601 may include an output of qualified matches of stored thread data 620 and qualified users for continued communication 630 from the matching algorithm 605.

In block 620, embodiment 601 may include a data output of qualified matches of stored thread data, a user may either close the query based on this data (close barrier?) 645, where the user may then score and provide feedback on the displayed thread (barrier broken) 650 or return to qualified matches (suitable matches) 625.

In block 630, embodiment 601 may include a data output of qualified matches of users with the option to accept the query data (accept barrier?) 635, responding to the query data and initializing the chat for further communication stream 640, or deny the query data (accept barrier?) 635 returning to the qualified matches (suitable matches) 625. may either close the query based on this data (close barrier) 645, where the user may then score and provide feedback on the displayed thread (barrier broken) 650 or return to qualified matches 625.

Figure 7:
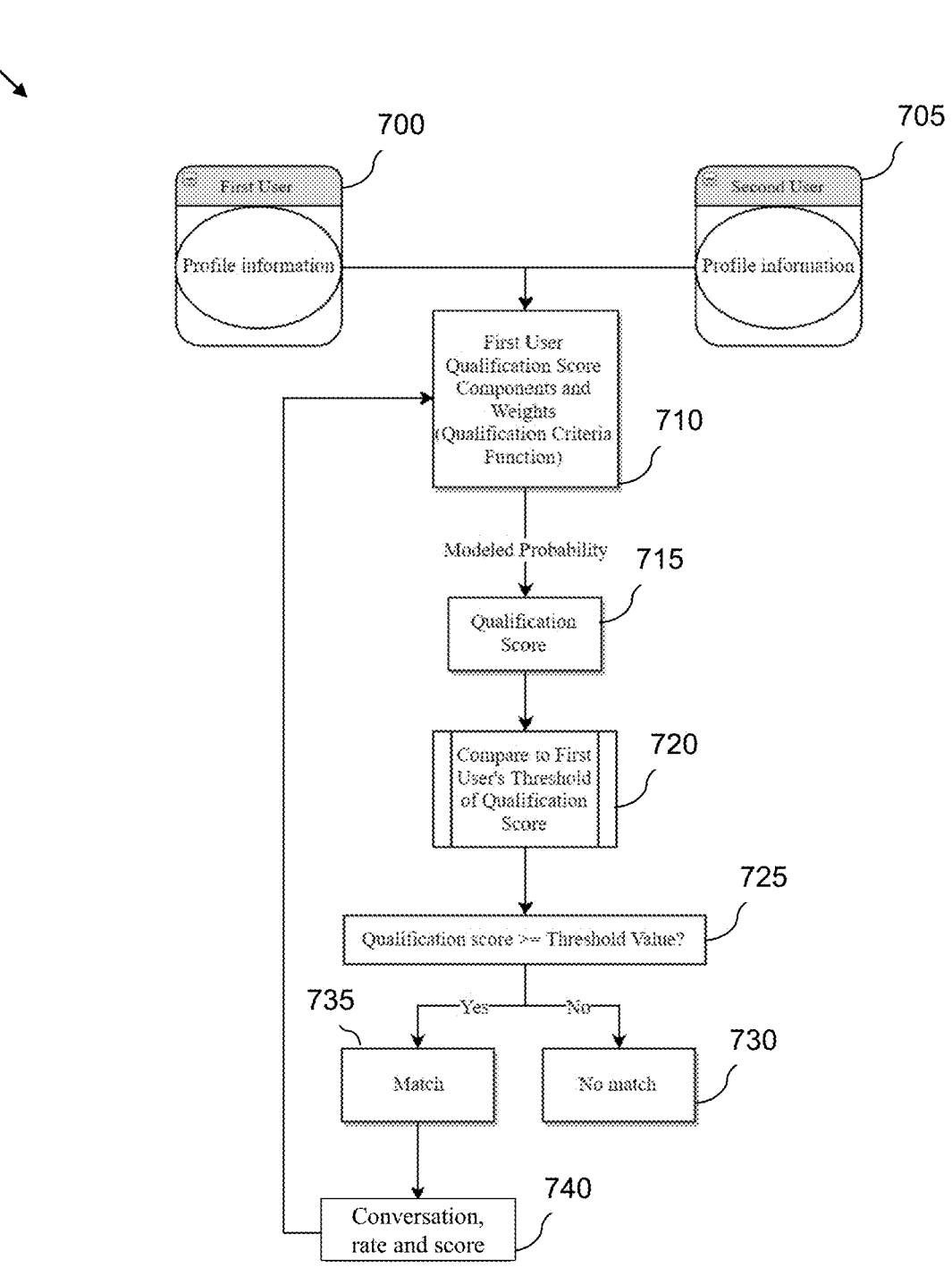
FIG. 7 illustrates a flow diagram of an example method for indexing, optimizing, and surfacing relevant and credible user profiles to respond to query data.

FIG. 7 illustrates a flow diagram of an example method for indexing, optimizing, and surfacing relevant and credible user profiles to respond to query data. The various processing blocks and/or data flows depicted in 701 are described in greater detail herein. The described processing blocks may be accomplished using some or all of the system components described in detail above and, in some implementations, various processing blocks may be performed in different sequences and various processing blocks may be omitted. Additional processing blocks may be performed along with some or all the processing blocks shown in the depicted flow diagrams: Some processing blocks may be performed simultaneously. Accordingly, embodiment 701 as illustrated (and described in greater detail below) is meant to be an example and, as such, should not be viewed as limiting. embodiment 701 may be implemented in the form of executable instructions stored on a machine-readable storage medium and/or in the form of electronic circuitry.

In block 700, embodiment 701 may include a profile dataset for a first user used as an input to the matching algorithm.

In block 705, embodiment 701 may include a profile dataset for a second user used as an input to the matching algorithm.

In block 710, embodiment 701 may include a dataset (Qualification Criteria Function) associated with a first user including weight values for components of at least one of geographical location data and history, skills, education and job history, lifestyles, habits, hobbies, age, preferences, and behavioral data used as inputs to a probability model which may utilize supervised or unsupervised learning. In one embodiment this weighted value dataset is stored within the user's profile dataset and is unique to each user, updated with each interaction.

In block 715, embodiment 701 may include a generated qualification score which is compared to a unique and dynamic qualification score threshold value 720 for each individual first user, which is updated via supervised or unsupervised learning models based on the first users historical scores of responses from second users. In one embodiment, this value is a variable specified by the user.

In block 725, embodiment 701 may include a comparison of the Qualification Score and Threshold of Qualification Score, this comparison may include a Boolean expression of the Qualification score being greater than or equal to the threshold value results in a true output, qualifying a second user to respond (match) 735, where if false (no match) 730 the profile is not qualified.

In block 740, embodiment 701 may include a communication stream between the first user and second user and feedback and scoring data produced by the first user. This data may be used as input to update an supervised or unsupervised model of the first user qualification score components, weights, and threshold value.

Figure 8:
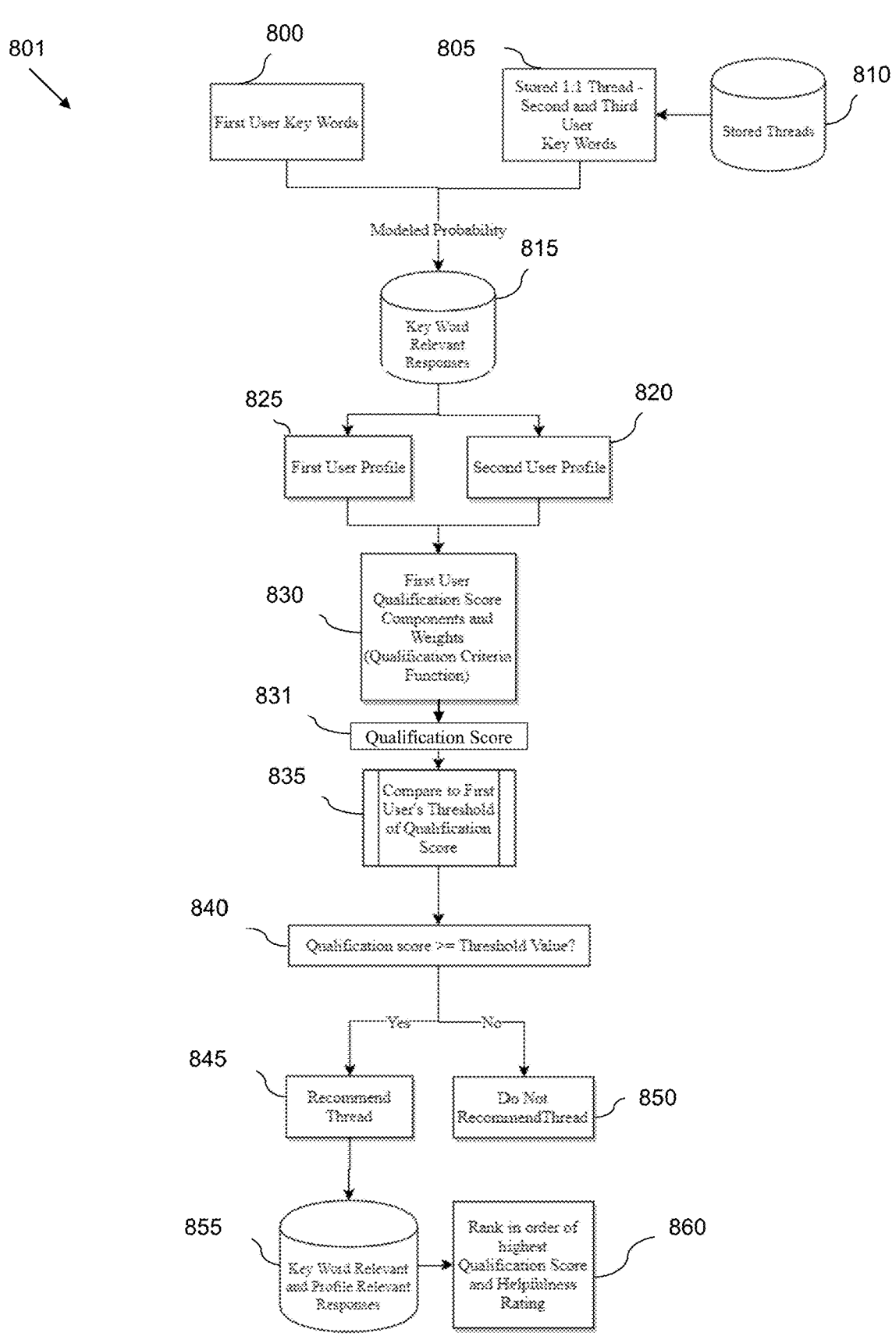
FIG. 8 illustrates a flow diagram of an example method for indexing, optimizing, ranking, and surfacing relevant and credible stored responses to query data.

FIG. 8 illustrates a flow diagram of an example method for indexing, optimizing, and surfacing relevant and credible user profiles to respond to query data. The various processing blocks and/or data flows depicted in 801 are described in greater detail herein. The described processing blocks may be accomplished using some or all of the system components described in detail above and, in some implementations, various processing blocks may be performed in different sequences and various processing blocks may be omitted. Additional processing blocks may be performed along with some or all the processing blocks shown in the depicted flow diagrams: Some processing blocks may be performed simultaneously. Accordingly, embodiment 801 as illustrated (and described in greater detail below) is meant to be an example and, as such, should not be viewed as limiting. embodiment 801 may be implemented in the form of executable instructions stored on a machine-readable storage medium and/or in the form of electronic circuitry.

In block 800, embodiment 801 may include a set of parsed and topic identified key words from user input query data indicated in 415 and 420.

In block 805, embodiment 801 may include a set of parsed and topic identified key words from communication thread data stored in a database 810.

In block 815, embodiment 801 may include a set of key word matched threads that have been indexed, matched, and ranked via modeled probability or other methodologies as would be understood by a person of ordinary skill in the art, without departing from the scope of the invention.

In block 825 and 820, embodiment 801 may include a profile dataset for a first user and second user which may be used as input to further optimize the matched thread data based on each user's profile dataset.

In block 830, embodiment 801 may include a dataset (Qualification Criteria Function) associated with a first user including weight values for components of at least one of but not limited to geographical location data and history, skills, education and job history, lifestyles, habits, hobbies, age, preferences, and behavioral data used as inputs to a probability model which may utilize supervised or unsupervised learning. In one embodiment this weighted value dataset is stored within the user's profile dataset and is unique to each user, updated with each interaction.

In block 831, embodiment 801 may include a generated qualification score which is compared to a unique and dynamic qualification score threshold value 835 for each individual first user, which is updated via supervised or unsupervised learning models based on the first users historical scores of responses from second users. In one embodiment, this value is a variable specified by the user.

In block 840, embodiment 801 may include a comparison of the qualification score and threshold of qualification score, this comparison may include a Boolean expression of the qualification score being greater than or equal to the threshold value results in a true output, qualifying a second user participating in the matched thread as a recommended thread user therein recommending the thread 845, where if false (do not recommend thread) 850 the thread is not qualified. In another embodiment, the thread may be recommended and displayed but at a lower ranking.

In block 855, embodiment 801 may include a set of key word matched and profile matched threads that have been indexed and optimized.

In block 860, embodiment 801 may include ranking the dataset of recommended threads in order of highest qualification score and/or helpfulness rating from other users.

Figure 9:
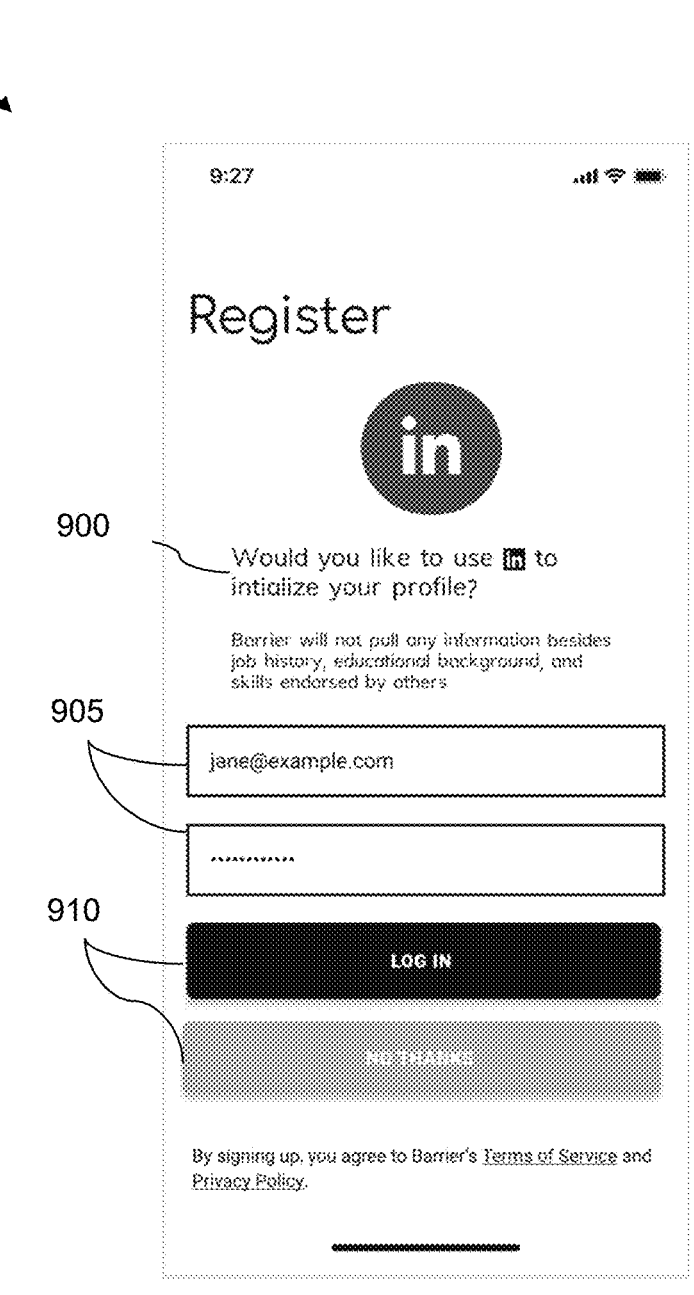
FIG. 9 illustrates an embodiment of a graphical user interface when registering a profile dataset.

FIG. 9 illustrates an embodiment of a graphical user interface when registering a profile dataset. As shown in the displayed page 901 an embodiment may include an initialization prompt using external services such as LinkedIn, Google, Apple, Facebook, Workday, etc. 900. A username and password may be requested for the user to enter log in information to the initialization platform 905. In another embodiment, this will be a direct link to log-in on the initialization platform.

Figure 10:
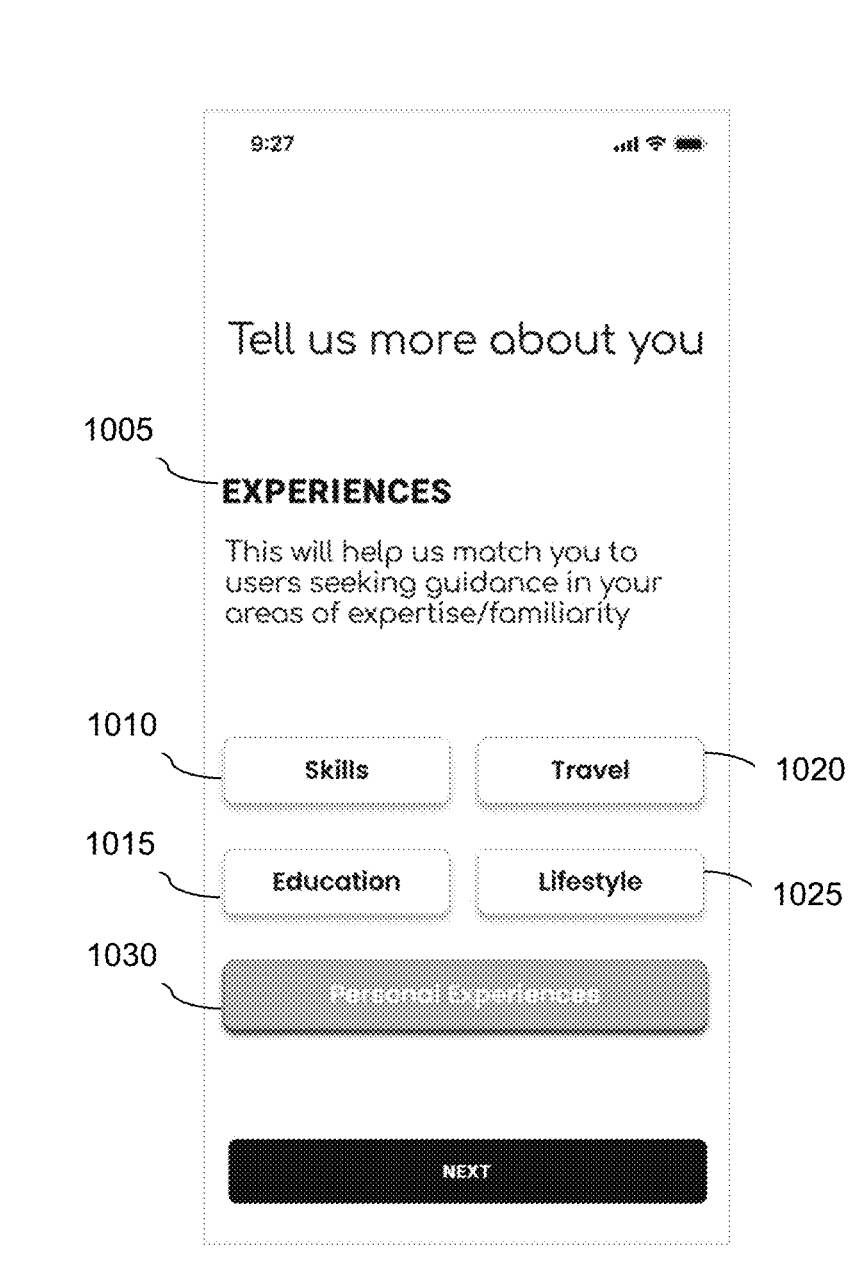
FIG. 10 illustrates an embodiment of a graphical user interface showing information to enter into the database for their profile.

FIG. 10 illustrates an embodiment of a graphical user interface showing information to enter into the database for their profile. Each piece of information may be input by the user and stored as text data, variable data, or Boolean data. As shown in the displayed page 1001 an embodiment may include a prompt for a user to input experiences 1005 that may be utilized as input for the matching algorithm outlined in FIG. 6. Information such as skills 1010 may include a variable data input of familiarity in a specific area, some exemplary subjects may include fishing, real estate, streaming, intellectual property, coding, NFTs, nutrition, startups, bodybuilding, gardening, investing, fundraising, GDP (Good Documentation Practices), DIY (Do It Yourself), DFM (Design For Manufacturing), etc. in another embodiment these inputs may be pre-populated from an initialization platform such as but not limited to LinkedIn, Pinterest, Instagram, Quora, Reddit, Workday, or any other platform providing data on skills. Travel input 1020 may include data input of geographical data and historical geographical data such as where the user has lived and where they have visited. In another embodiment, these inputs may be pre-populated from an initialization platform such as LinkedIn, Facebook, Google, Google Maps, Apple, or any other platform providing geographical data. Education input 1015 may include data input on age, job history, certifications, projects, educational background including major, minor, degree, school. In another embodiment, these inputs may be pre-populated from an initialization platform such as LinkedIn, Facebook, Workday, or any other platform providing professional data. Lifestyle input 1025 may include data input on the lifestyle of the user such as coffee shops, rock climbing, foodie, running, fitness, nutrition, reading, nightlife, etc. In another embodiment, this input may be pre-populated from an initialization platform such as but not limited to LinkedIn, TikTok, Pinterest, Instagram, or some other platform providing data on interests and lifestyle. In another embodiment, this information may be requested in the form of a questionnaire. Personal Experiences input 1030 may include data more personal such as psychological or physical trauma, life setbacks, addiction, etc.

All profile data may be taken from these various sources and transformed and stored in a data structure for actionable retrieval and usage such as a dictionary, set, or list. The dataset may consist of a unique identifier for each user, a key and value for each skill, a key for each location with a text value of visited or lived, age, gender, preferences, a key and value for each of the components used for matching along with weights associated, a qualification threshold score, behavioral data, keys and values for educational background, list of lifestyle text data, list of personal experience data, etc.

Figure 11:
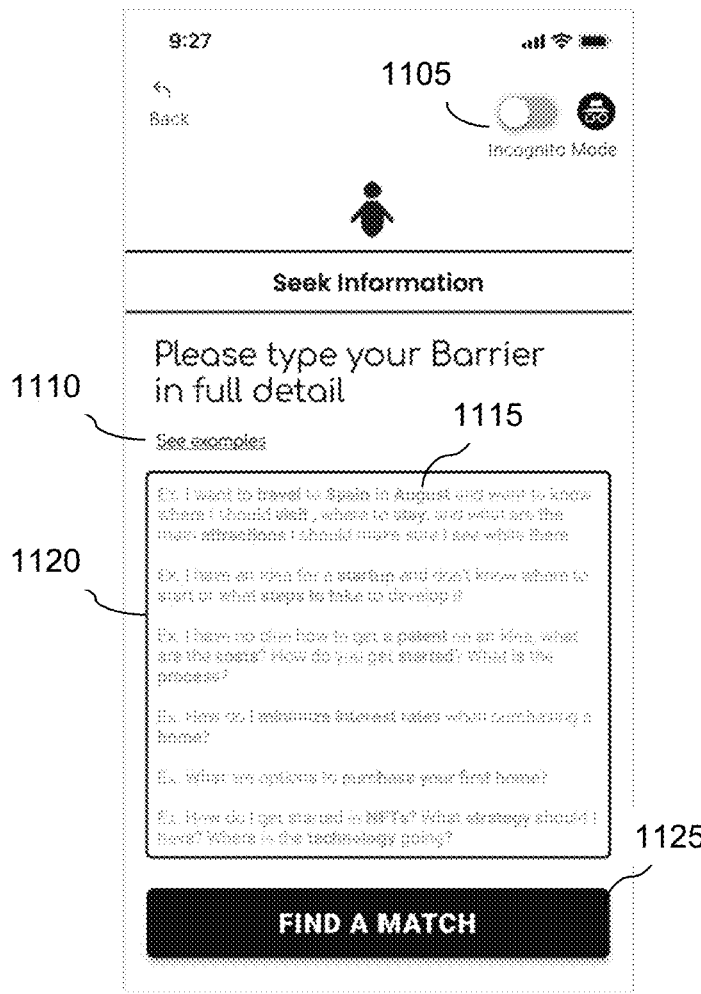
FIG. 11 illustrates an embodiment of a graphical user interface to input query data.

FIG. 11 illustrates an embodiment of a graphical user interface to input query data. As shown in the displayed page 1101 an embodiment may include an incognito mode 1105 to hide profile data from the matched user when responding to the query data. This window may include a text box 1120 for a user to input text data for the query. In another embodiment, there may be another window or button to attach media to the query. An embodiment may include a toggle to show examples 1110 of query data and key words bolded 1115 to show the topics that would be extracted based on what was input by the user. The displayed page 1101 may include a button to submit the query.

Figure 12:
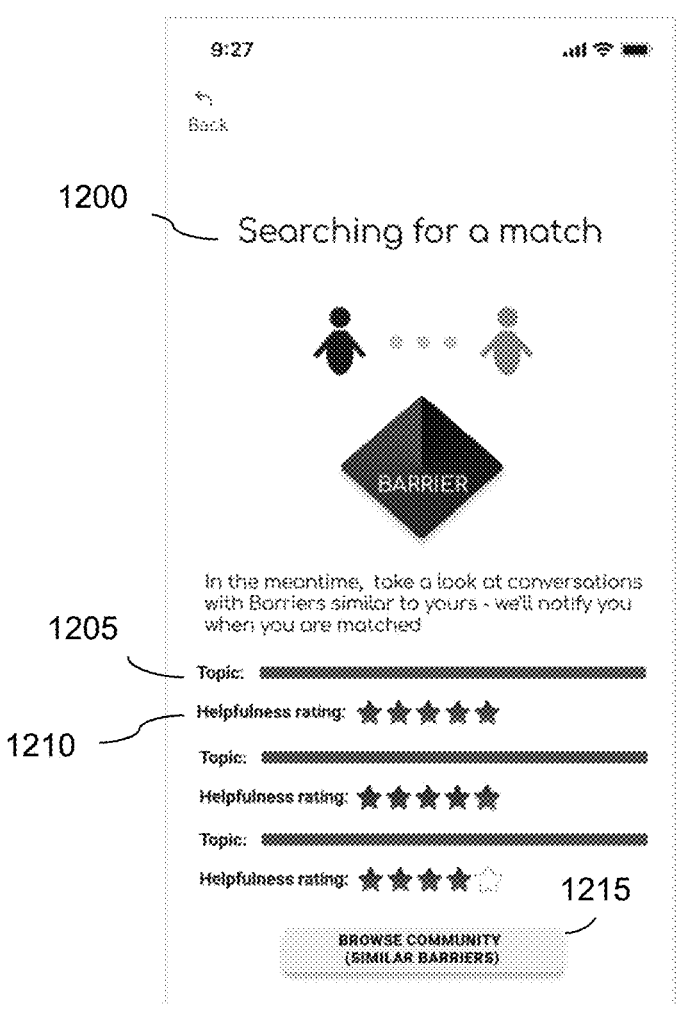
FIG. 12 illustrates an embodiment of a graphical user interface of displaying the indexed, optimized, and ranked results of stored data.

FIG. 12 illustrates an embodiment of a graphical user interface of displaying the indexed, optimized, and ranked results of stored data. As shown in the displayed page 1201 an embodiment may include an indication 1200 that the query is being processed and a qualified match is being found to accept and respond to the query. The displayed page 1201 may include a set of key word matched and profile matched thread data 1205 that have been indexed and optimized. Each thread may be ranked in order of highest qualification score and/or helpfulness rating from other users, along with an associated rating of helpfulness rating from other user 1210. In another embodiment the GUI allows interaction with the displayed thread to show the full communication stream exchange between the two users with an opportunity to rate helpfulness. The displayed page 1201 may include a button to view more key word matched and profile matched thread data.

Figure 13:
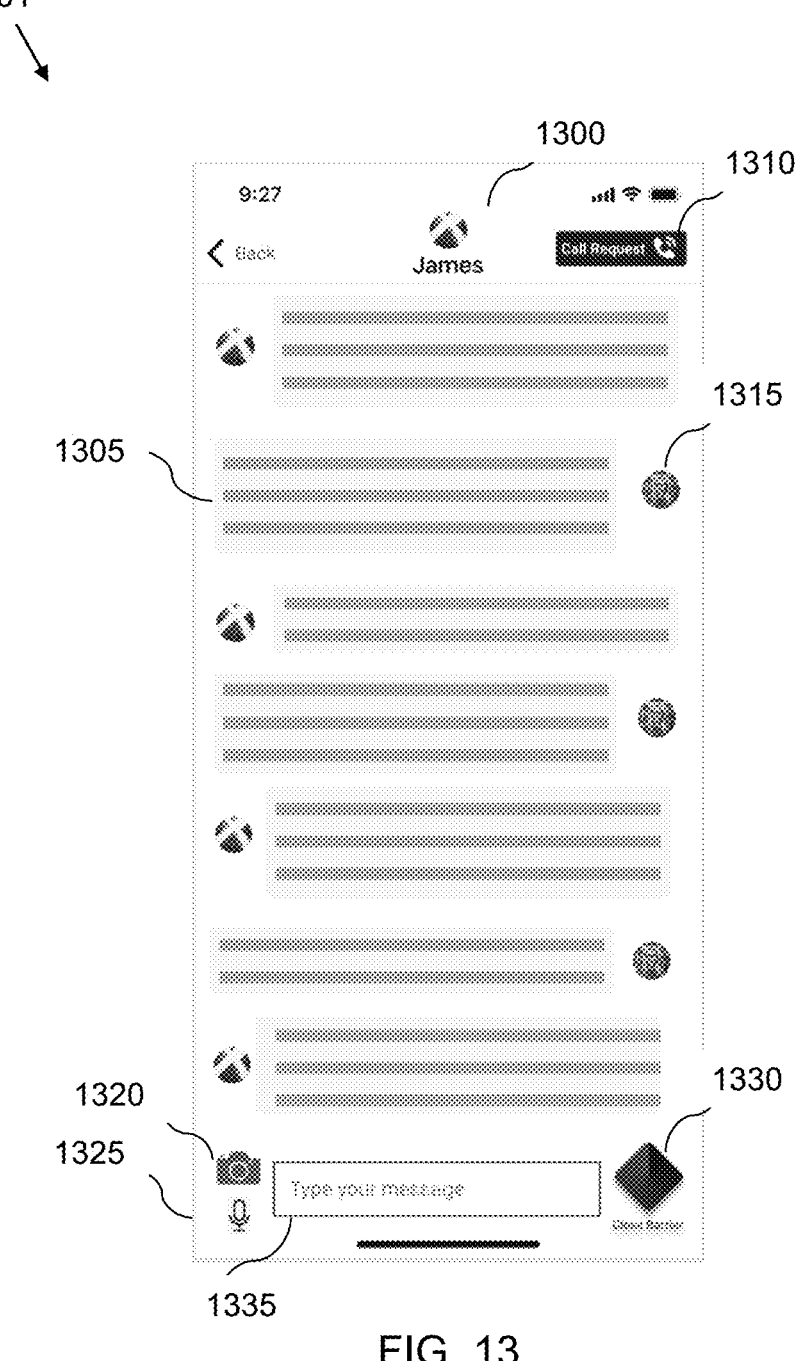
FIG. 13 illustrates an embodiment of a graphical user interface for a communication window for two users.

FIG. 13 illustrates an embodiment of a graphical user interface for a communication window for two users. As shown in the displayed page 1301 an embodiment may include a display of the profile of the second user responding to the query data 1300. All text exchanges 1305 may be shown in this window with each user profile displayed next to the respective text 1315. All text data input may be input into a text box 1335. An embodiment may include different means of communication streams including a call option 1310, media exchange which may be in the form of pictures 1320 or voice data 1325. An embodiment may include a button to close the query 1330.

Figure 14:
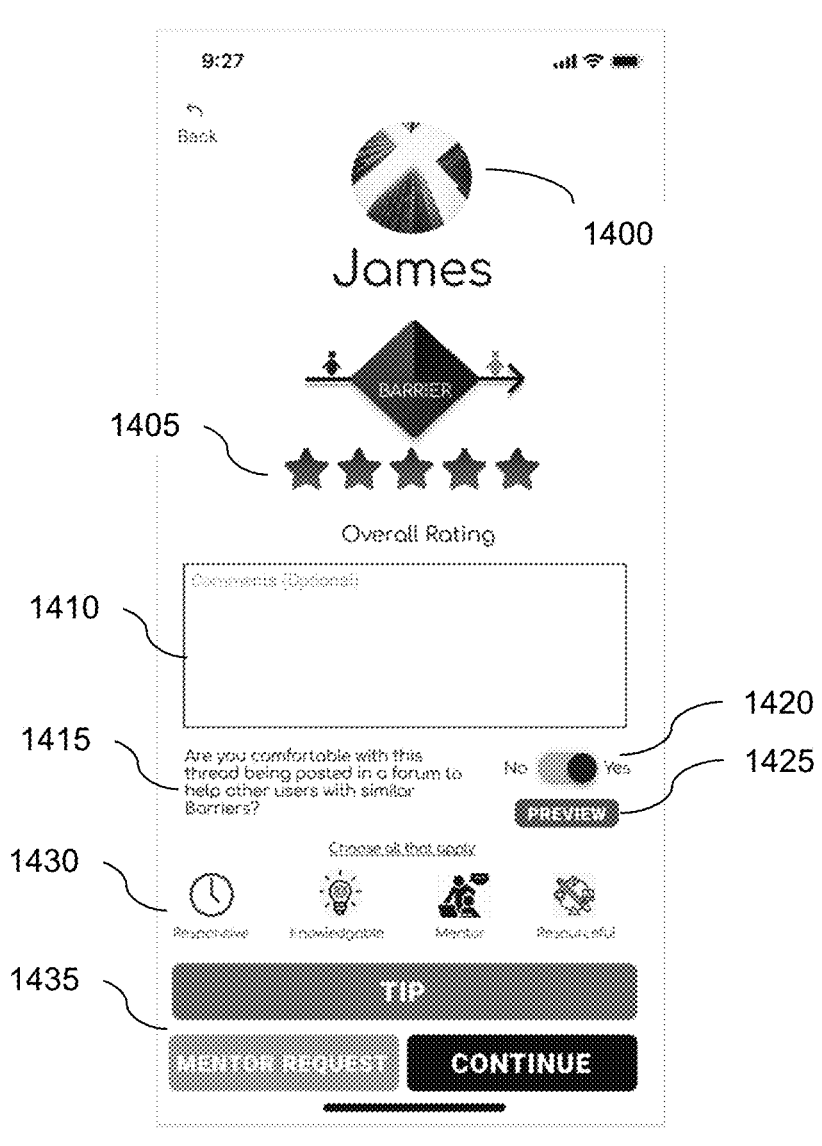
FIG. 14 illustrates an embodiment of a graphical user interface for feedback of a response to query data.

FIG. 14 illustrates an embodiment of a graphical user interface for feedback of a response to query data. As shown in the displayed page 1401 an embodiment may include a display of the profile of the second user that responded to the query data 1400. An embodiment may include a variable rating 1405 of the response and communication stream. In another embodiment, this rating may be a Boolean response of good or bad. Comments may be input into a text box 1410 for further input. In another embodiment, this may not be used. Each user may be prompted with a question of approval 1415 to store and show the communication stream data publicly, where a Boolean response of yes or no may be requested 1420. In an embodiment the user may have the ability to preview the communication stream data 1425 to indicate what pieces of the dataset are desired for removal before approval. An embodiment may include further rating of the second user in the form of generic tags 1430 that describe the interaction. In an embodiment, the first user may have a plurality of choices 1435 to make after review including tipping the second user, a request for a connection to the second user for future queries (mentor request), and continue to the main menu.

Figure 15:
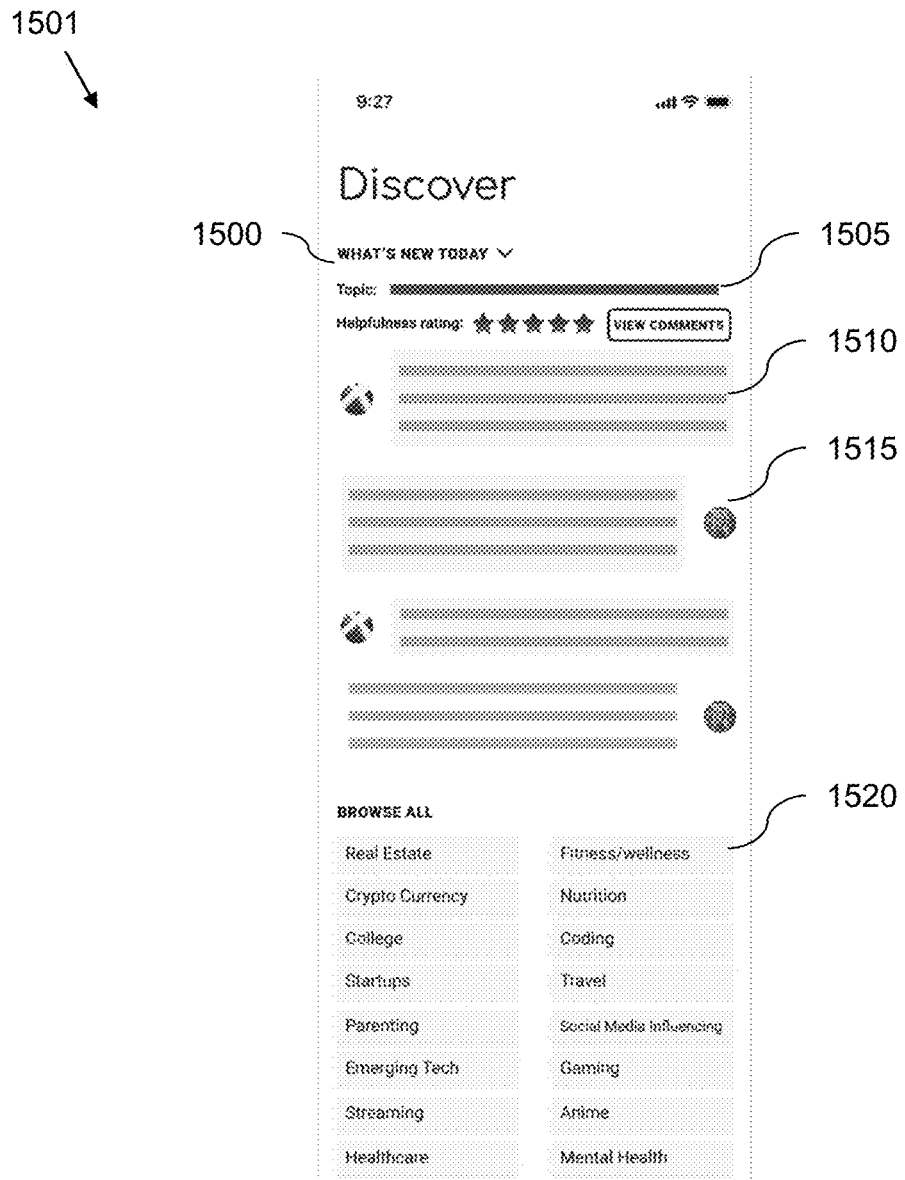
FIG. 15 illustrates an embodiment of a graphical user interface for browsing stored threads of responses to query data.

FIG. 15 illustrates an embodiment of a graphical user interface for browsing stored threads of responses to query data. As shown in the displayed page 1501 an embodiment may include a display of stored threads between users sorted by date (what's new today) 1500. In another embodiment, threads can be sorted by relevancy to a topic, user, or rating. In an embodiment, topics parsed and identified from input query data may be shown 1505. In the display page 1501, a preview of a given thread may be shown 1510 with communications stream data displayed, along with each user's profile 1515. In another embodiment the GUI allows interaction with the previewed thread to show the full communication stream exchange between the two users with an opportunity to rate helpfulness. An embodiment may include an ability to browse thread data associated with specific topics 1520.

Figure 16:
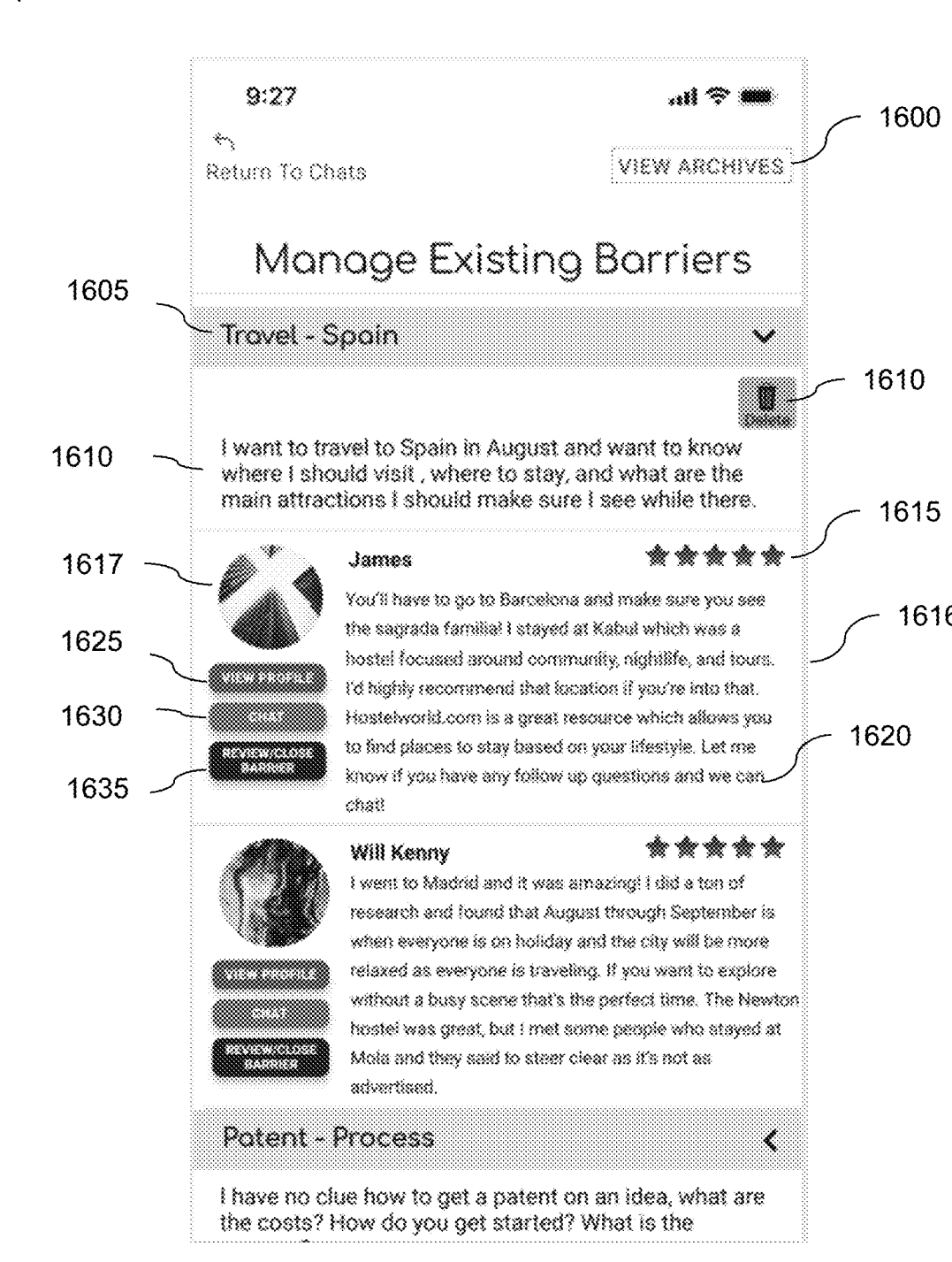
FIG. 16 illustrates an embodiment of a graphical user interface for viewing query responses.

FIG. 16 illustrates an embodiment of a graphical user interface for viewing query responses. As shown in the displayed page 1601 an embodiment may include a display to interact with and view all queries input by a user, closed (view archives) 1600 and open. An embodiment may include each open query containing the components of a topic 1605 that was parsed and identified, the query text data input by the user 1610, an ability to delete a query request 1610, and a display of responses from second users that responded to the query data 1616. In an embodiment, included in each response is a variable rating of the user, the profile of the user 1617, the initial response to the query data 1620, an ability to view the second user's profile 1625, an element to enable the first user to further communicate 1630, and an element to close and review a query response 1635.

Figure 17:
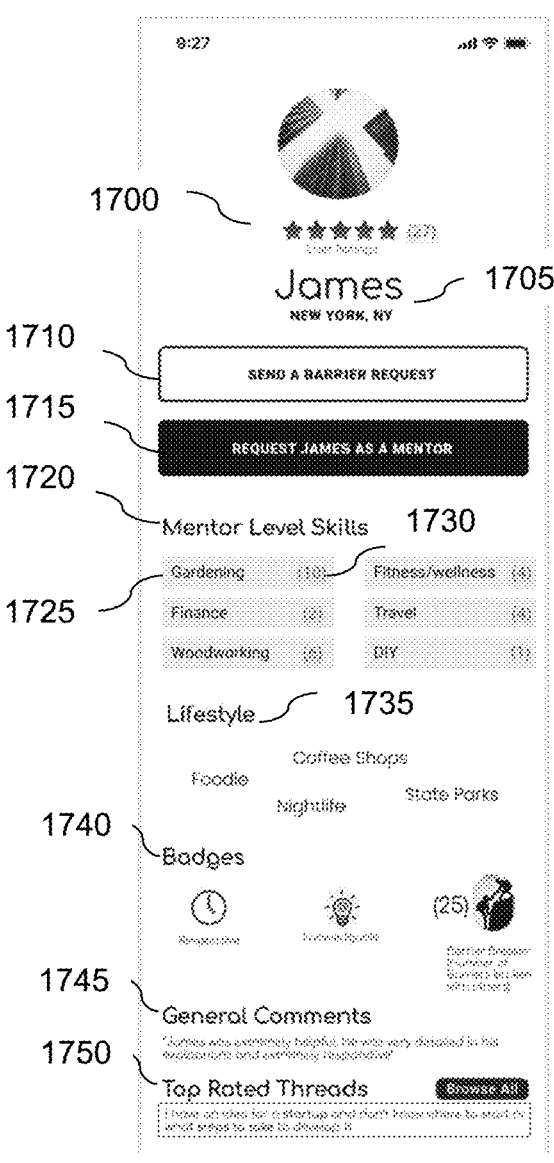
FIG. 17 illustrates an embodiment of a graphical user interface for displaying database data on a user's profile.

FIG. 17 illustrates an embodiment of a graphical user interface for displaying database data on a user's profile. As shown in the displayed page 1701 an embodiment may include a display for select data contained in a user dataset. An embodiment may include displaying the data of a variable rating for the user along with number of queries responded to and closed 1700, a user's name and home location 1705, other skills that the user is qualified to respond to 1720, lifestyle data 1735, and feedback-based data such as generic tags (badges) 1740, general comments from other users 1745, and top-rated thread data 1750. An embodiment may include further information on other skills qualified to respond to such as the name of the skill 1725 and the number of queries responded to and closed with respect to the skill 1730. In another embodiment, the display 1701 may include more pages designated to each skill a user may be qualified to respond to, including indication that they are verified in the skill, and recommended content by embedding or linking content from external platforms such as Youtube, Instagram, TikTok, etc. and all feedback data associated with this specific skill.

Figure 18:
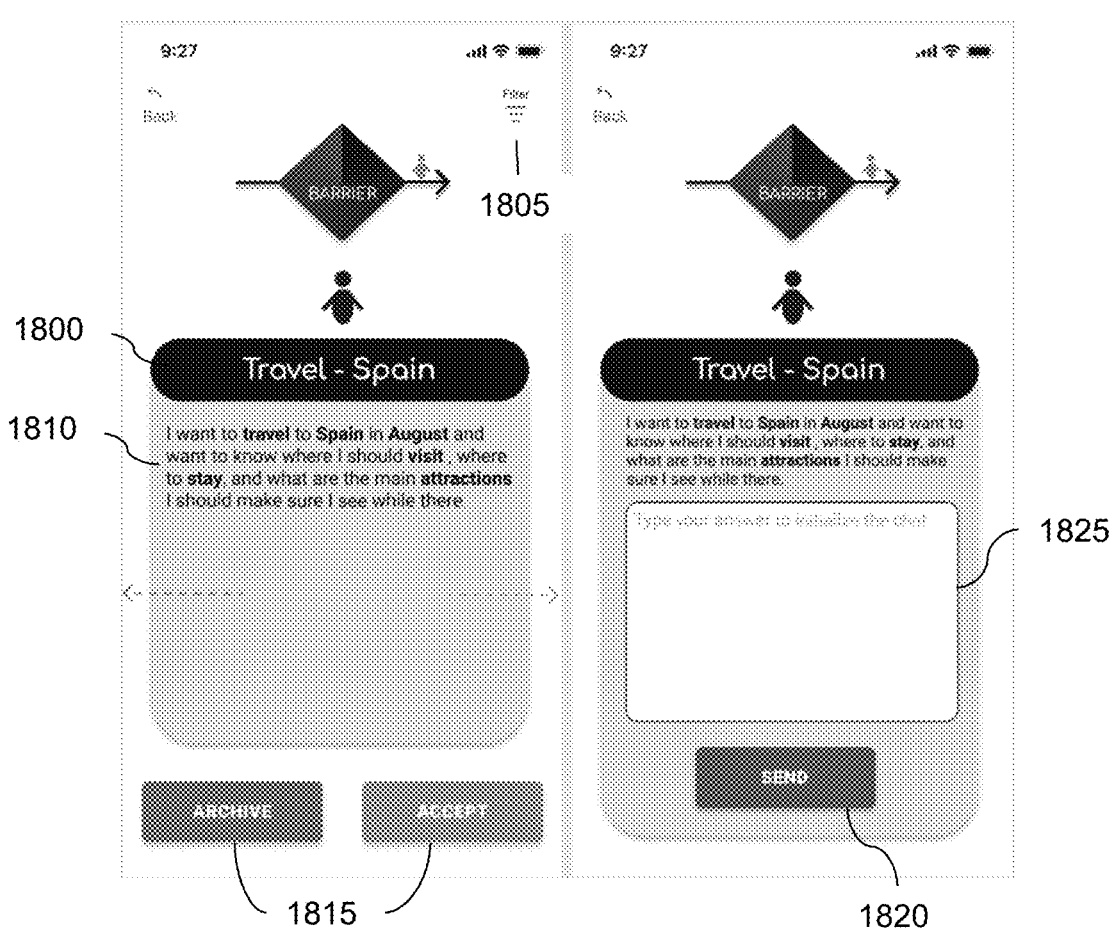
FIG. 18 illustrates an embodiment of a sequence of graphical user interfaces for query response for a qualified user.

FIG. 18 illustrates an embodiment of a sequence of graphical user interfaces for query response for a qualified user. As shown in the displayed page 1801 an embodiment may include query data components including a topic 1800 parsed and identified from the input query data from a first user 1810. An embodiment may include an option to accept or deny/archive the query 1815. An embodiment may include upon acceptance, a user initializing the communication stream with a response to the query data with a text response 1825 before completing the acceptance of the query (send) 1820. In another embodiment, a response may include media data. The display page 1801 may include a filter option to filter shown queries a user is qualified to respond to in their queue by topic or skill.

In various embodiments, functionality for implementing systems or methods of various embodiments may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various embodiments described above. Accordingly, the present invention is defined by the claims and their equivalents.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for facilitating database queries through the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. A computer-implemented method for a database indexing, optimizing, and ranking system for online queries, the computer-implemented method comprising:

obtaining query data from a first user, wherein the query data is comprised of a text string identifying an inquiry, wherein the first user is associated with a first user profile containing data provided by the first user;

algorithmically parsing the query data to identify at least one query topic;

algorithmically identifying responses that are relevant to the query topic, the algorithmic identifying comprising identifying responses that are relevant to the query topic, wherein the responses are provided and scored by other users, wherein each other user is associated with a user profile, the algorithmic identifying further comprising identifying a subset of responses that include users with a user profile that matches a first user's profile;

generating first graphical user interface elements displaying the subset of responses in order of a match score and/or aggregate scores associated with each subset of responses;

sending the obtained query data to other users whose user profiles match the first user's profile;

generating second graphical user interface elements to enable the first user to communicate with other users who respond to the sent query request;

storing the information generated by the second graphical user interface elements;

scanning the information generated by the graphical user interface elements for sensitive information to identify a set of sensitive information, via user identification or keyword identification and matching such as YAKE, RAKE, TextRank, KeyBert, Naive Bayes classifier, or pre-trained models for keyword extraction such as but not limited to Bag-of-words, TF-IDF, Averaged Glo Ve, Bag-of-Concepts, VLAC, and BoWC;

removing the set of sensitive information.

2. A computer-implemented method for a database indexing, optimizing, and ranking system for online queries, the computer-implemented method comprising:

obtaining query data from a first user, wherein the query data is comprised of a text string identifying an inquiry, wherein the first user is associated with a first user profile containing data provided by the first user;

algorithmically parsing the query data to identify at least one query topic;

algorithmically identifying responses that are relevant to the query topic, the algorithmic identifying comprising identifying responses that are relevant to the query topic, wherein the responses are provided and scored by other users, wherein each other user is associated with a user profile, the algorithmic identifying further comprising identifying a subset of responses that include users with a user profile that matches a first user's profile;

generating first graphical user interface elements displaying the subset of responses in order of a match score and/or aggregate scores associated with each subset of responses;

sending the obtained query data to other users whose user profiles match the first user's profile;

generating second graphical user interface elements to enable the first user to communicate with other users who respond to the sent query request;

storing the information generated by the second graphical user interface elements;

scanning the information generated by the graphical user interface elements for sensitive information to identify a set of sensitive information, via user identification or keyword identification and matching such as YAKE, RAKE, TextRank, KeyBert, Naive Bayes classifier, or pre-trained models for keyword extraction such as but not limited to Bag-of-words, TF-IDF, Averaged GloVe, Bag-of-Concepts, VLAC, and BoWC;

encrypting the set of sensitive information.

3. A computer-implemented method for a database indexing, optimizing, and ranking system for online queries, the computer-implemented method comprising:

obtaining query data from a first user, wherein the query data is comprised of a text string identifying an inquiry, wherein the first user is associated with a first user profile containing data provided by the first user;

algorithmically parsing the query data to identify at least one query topic;

algorithmically identify responses that are relevant to the query topic, the algorithmic identifying comprising identifying responses that are relevant to the query topic, wherein the responses are provided and scored by other users, wherein each other user is associated with a user profile, the algorithmic identifying further comprising identifying a subset of responses that include users with a user profile that matches a first user's profile;

generating first graphical user interface elements displaying the subset of responses in order of a match score and/or aggregate scores associated with each subset of responses;

verifying a second user's profile credentials through submission of supporting information for a third-party review.

4. A computer-implemented method for a database indexing, optimizing, and ranking system for online queries, the computer-implemented method comprising:

obtaining query data from a first user, wherein the query data is comprised of a text string identifying an inquiry, wherein the first user is associated with a first user profile containing data provided by the first user;

algorithmically parsing the query data to identify at least one query topic;

algorithmically identify responses that are relevant to the query topic, the algorithmic identifying comprising identifying responses that are relevant to the query topic, wherein the responses are provided and scored by other users, wherein each other user is associated with a user profile, the algorithmic identifying further comprising identifying a subset of responses that include users with a user profile that matches a first user's profile;

generating first graphical user interface elements displaying the subset of responses in order of a match score and/or aggregate scores associated with each subset of responses;

verifying a second user's profile credentials through submission of supporting information for a third-party review;

providing a visual indication that the second user is verified in the topic of interest.

* * * * *